United States Patent
Bernsen et al.

(10) Patent No.: US 9,398,451 B2
(45) Date of Patent: Jul. 19, 2016

(54) METHOD FOR ENABLING A WIRELESS SECURED COMMUNICATION AMONG DEVICES

(75) Inventors: Johannes Arnoldus Cornelis Bernsen, Eindhoven (NL); Maurice Herman Johan Draaijer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 154 days.

(21) Appl. No.: 14/001,390

(22) PCT Filed: Feb. 9, 2012

(86) PCT No.: PCT/IB2012/050587
§ 371 (c)(1),
(2), (4) Date: Aug. 23, 2013

(87) PCT Pub. No.: WO2012/117306
PCT Pub. Date: Sep. 7, 2012

(65) Prior Publication Data
US 2013/0337739 A1    Dec. 19, 2013

(30) Foreign Application Priority Data
Mar. 1, 2011 (EP) ..................... 11305216

(51) Int. Cl.
| H04L 29/06 | (2006.01) |
| H04W 4/00 | (2009.01) |
| H04W 84/18 | (2009.01) |
| H04W 12/04 | (2009.01) |

(52) U.S. Cl.
CPC ........... *H04W 12/04* (2013.01); *H04L 63/0884* (2013.01); *H04L 63/18* (2013.01); *H04W 4/008* (2013.01); *H04W 84/18* (2013.01)

(58) Field of Classification Search
None
See application file for complete search history.

(56) References Cited

U.S. PATENT DOCUMENTS

| 6,968,153 B1 * | 11/2005 | Heinonen et al. | 455/11.1 |
| 2003/0069989 A1 * | 4/2003 | Silvester | 709/238 |
| 2004/0122649 A1 | 6/2004 | Bartek | |
| 2004/0203354 A1 * | 10/2004 | Yue | 455/41.1 |
| 2008/0037495 A1 * | 2/2008 | Anjum et al. | 370/338 |
| 2009/0058635 A1 | 3/2009 | LaLonde | |
| 2010/0079106 A1 * | 4/2010 | Graham | 320/115 |
| 2010/0312849 A1 | 12/2010 | Miyabayashi | |
| 2011/0021140 A1 | 1/2011 | Binier | |
| 2011/0210831 A1 * | 9/2011 | Talty et al. | 340/10.51 |
| 2011/0221590 A1 * | 9/2011 | Baker et al. | 340/539.12 |

FOREIGN PATENT DOCUMENTS

WO    W003053048 A1    6/2003

OTHER PUBLICATIONS

Cernevskis et al, Wireless roaming, 2006 http://www.mikrotik.com/download/MUM-ULDIS-Mesh1.pdf.*

* cited by examiner

*Primary Examiner* — Ping Hsieh
*Assistant Examiner* — James Yang
(74) *Attorney, Agent, or Firm* — Larry Liberchuk

(57) ABSTRACT

A wireless docking station for enabling a wireless secured communication between at least one first slave device (a1-aN) and a first master device comprises: a second master device for pairing with the at least one first device (a1-aN) using a pairing protocol implemented on the at least one first device (a1-aN), at least one relayed slave device (b1-bN) which corresponds to the at least one first device (a1-aN), and which is adapted to pair with the first master device using a secured protocol, and a radio module for sending to the first master device information about the at least one relayed slave device (b1-bN).

12 Claims, 3 Drawing Sheets

METHOD FOR ENABLING A WIRELESS SECURED COMMUNICATION AMONG DEVICES

The present invention relates to wireless home networks and, more particularly, to methods for enabling a wireless secured communication between at least one slave device and a master device. This invention is, for example, relevant for Bluetooth wireless network.

The document WO03/053048A1 discloses a system comprising devices which are interconnected wirelessly. This system may form a docking environment adapted to communicate with portable devices, such as Personal Digital Assistants PDAs, Smartphones, laptops, etc. Suitable technologies for wireless communication between all this kinds of devices are, for instance, Wi-Fi or Bluetooth or the like. Although the communication is wireless, the devices are not able to communicate directly, and they need to be paired. Once the initial pairing between two devices has been performed, further pairing between these two devices may occur in an automatic way.

There are various possibilities for pairing devices. For instance, in conventional Bluetooth core specifications for Bluetooth versions prior to V2.1, pairing of Bluetooth devices may require the user to enter a Personal Identification Number PIN code if he wants a secure pairing between the devices.

In Bluetooth V2.1, another pairing scheme called Secure Simple Pairing is added. There are four basic variants of Secure Simple Pairing. The first two require user action ('Passkey Compare' and 'Passkey Entry'). The next one, 'Simply Works', does not require user interaction, but it does not offer protection against so-called Man-in-the-Middle-Attacks. The remaining one, 'Out of Band', may involve some user interaction, such as moving one device close to the other device in case Near Field Communication (NFC) is used.

A drawback of the existing pairing protocols is that the devices have to be able to perform a pairing protocol that is available for both of them. Another drawback is that the portable device must pair to a single device at a time and with the appropriate pairing protocol.

The aim of the invention is to solve at least one of the above-mentioned drawbacks.

It is an object of the invention to provide a method for enabling a wireless secured communication between at least one slave device and a master device.

This object is achieved in a method comprising:
an intermediate system configuring a second master device,
pairing the at least one slave device with the second master device using a pairing protocol implemented on the at least one slave device;
the intermediate system configuring at least one relayed slave device which corresponds to the at least one slave device, the at least one relayed slave device being adapted to pair with the first master device using a secured pairing protocol;
the intermediate system sending to the first master device information about the at least one relayed slave device.

The method has the advantage of making the first slave devices available for pairing via a secured pairing protocol to the first master device whatever the pairing protocol available for each first slave device.

According to an embodiment of the invention, the method also comprises:
the first master device selecting at least one relayed slave device to connect to;
performing an interaction required by the secured pairing protocol only once for the at least one selected device.

This has the advantage of simplifying the user interaction. Instead of repeating the pairing of the first master device to each relayed slave device, the user is just required to do it once for all the selected relayed slave devices. Therefore, the claimed invention enables a convenient and secured pairing between the wireless devices whatever the number of first slave devices and whatever the pairing protocols available for the first slave devices.

According to other embodiments of the invention:
the secured protocol may include an out-of-band interaction between the first master device and the intermediate system;
the first master device may only pair with at least one predetermined relayed slave device;
secured pairing information may be recorded to allow automatically further pairing of the first master device;
the secured pairing protocol may be the ones of the Bluetooth communication standard;
the secured pairing protocol may be the "Secure Simple Pairing—Out of Band" protocol of Bluetooth V2.1;
the secured protocol may use a Near Field Communication between the first master device and the intermediate system.

According to another embodiment of the invention in which the wireless secured communication comprises an additional set of at least one slave devices, the method further comprises:
an additional intermediate system configuring a third master device,
pairing said additional set of at least one slave device with the third master device using a pairing protocol implemented on the at least one slave device of said additional set;
the additional intermediate system configuring an additional set of at least one relayed slave device which corresponds to the additional set of at least one slave device, the additional set of at least one relayed slave device being adapted to pair with the first master device using a secured pairing protocol;
configuring a communication channel between the intermediate systems for exchanging information about relayed slave devices;
one of the intermediate systems sending to the first master device information about the relayed slave devices.

According to another embodiment of the invention in which the wireless secured communication also comprises an additional set of at least one slave devices, the method further comprises:
an additional intermediate system configuring a third master device,
pairing said additional set of at least one slave device with the third master device using a pairing protocol implemented on the at least one slave device of said additional set;
configuring a communication channel between the intermediate systems for making available data of the additional set of slave devices to the intermediate system;
the intermediate system configuring an additional set of at least one relayed slave device which corresponds to the additional set of at least one slave device, the additional set of at least one relayed slave device being adapted to pair with the first master device using a secured pairing protocol;
the intermediate system sending to the first master device information about the relayed slave devices.

These and other aspects of the invention will be apparent from and will be elucidated with reference to the embodiments described hereinafter.

The present invention will now be described in more detail, by way of examples, with reference to the accompanying drawings, wherein FIG. 1 is a schematic drawing of a wireless network with slave devices, intermediate system, first relayed slave devices, and first master device;

The present invention relates to a method for enabling a wireless secured communication between wireless devices.

A first wireless device is able to create a connection with at least one other wireless device, in which case the first wireless device becomes the master device of the new connection, and the other wireless devices become the slave devices.

Figure 1:
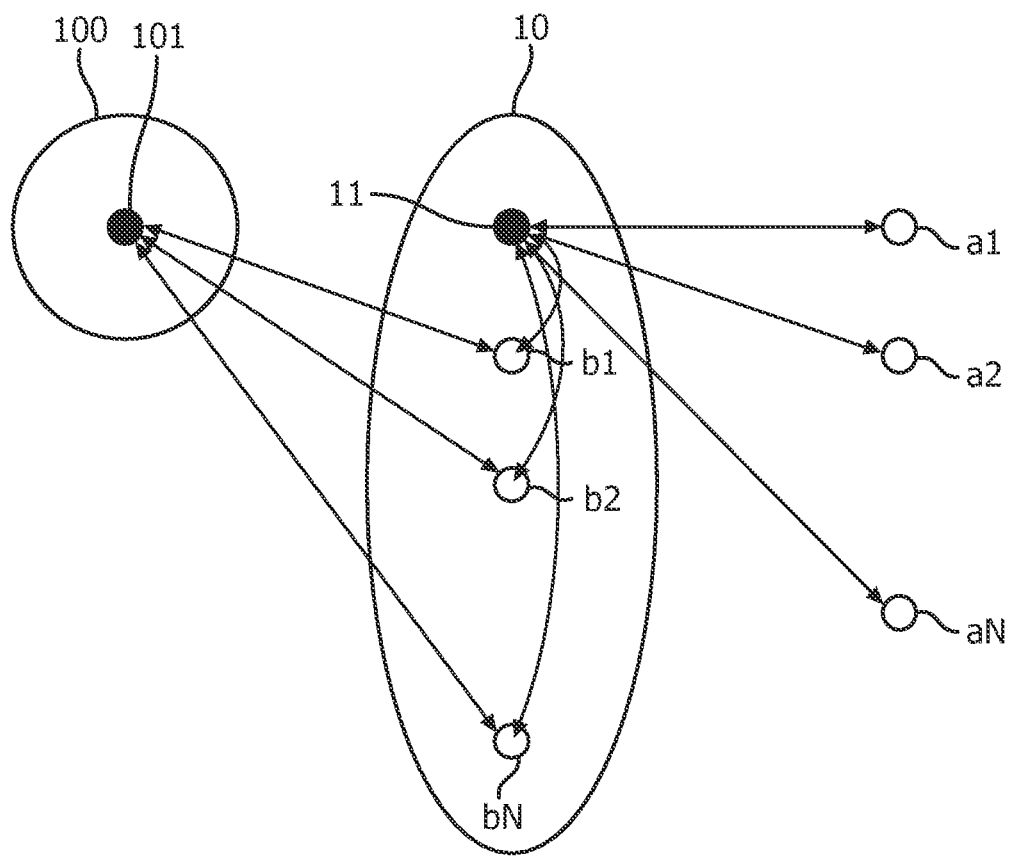

In FIG. 1, the slave devices are depicted under the reference a1, a2, to aN. The at least one slave device may comprise devices like mouse, keyboard, television set, DVD player, loudspeakers, etc. All these slave devices may preferably use an existing version of the Bluetooth protocol for wireless communication according to one embodiment of the invention. The Bluetooth pairing protocol used by the slave devices is not necessarily convenient for a user who has to perform the pairing.

The first device, depicted under the reference 100 in the figures, may be one of the devices, portable or not, like mobile phones, tablet computers, digital video or still cameras, portable audio devices, etc. The first device 100 comprises a first master device 101, and implements a secured wireless communication protocol for pairing. According to one embodiment of the invention, the secured protocol is the "Secure Simple Pairing—Out of Band" protocol of Bluetooth V2.1; and it is implemented in the Bluetooth master 101. As an additional feature, the secured protocol may also comprise NFC for pairing.

According to the invention, an intermediate system 10 plays the role of a wireless docking station. The wireless docking station 10 may be a specific and dedicated station, or may be incorporated as an application or software in any other device, e.g. a PC, access point, media player, TV, PC monitor, etc.

The docking station 10 comprises a first radio module (not shown), for example a software-radio based system with a single transmitter/receiver section. The first radio module comprises a second master device 11, for example a Bluetooth master device, for pairing with the slave devices a1-aN, which are in this example Bluetooth slave devices. The docking station 10 preferably supports all known pairing mechanisms. For instance, the Bluetooth master device 11 of the docking station 10 preferably comprises the existing pairing protocols of all Bluetooth versions till V4.0 for pairing with the corresponding slave devices a1-aN.

The docking station 10 and the slave devices a1-aN form a docking environment for the first device 100. In this environment, the docking station 10 makes the slave devices a1-aN available to connect to a master device in a more secured and convenient manner. To do this, in a preliminary step of the method according to the invention, the slave devices a1-aN are paired with the second master device 11 of the docking station 10 using an appropriate pairing protocol for each slave device a1-aN, for example via user interaction. In the case of Bluetooth pairing, by using the second Bluetooth master device 11, all of the N Bluetooth slave devices are paired with the docking station 10 using the Bluetooth pairing protocol that each device supports.

After this initial pairing, in a next step of the invention, the docking station 10 creates and configures virtual or relayed slave devices depicted under the reference b1, b2 to bN. These devices can be paired using a secured protocol. They have a different device address ('BD_ADDR'), may have a different name, and use a different link key, but appear otherwise functionally identical to the already paired first devices a1-aN. In one embodiment, the first radio module of the docking station 10 may implement not only the Bluetooth master 11, but also the relayed devices b1-bN, such that the relayed devices b1-bN transmit messages and react to other Bluetooth masters like the one of the first device 100. This may be done by scheduling the transmit times of the first Bluetooth radio module and the slaves a1-aN in the time slots that the second Bluetooth master and its paired slave device do not use. In another embodiment, the docking station 10 may comprise one additional Bluetooth radio module implementing the relayed devices b1-bN, or more than one additional Bluetooth radio module.

The relayed devices b1-bN have a name which may refer to the name of the corresponding slave devices a1-aN, and which may comprise additional information indicating a link with the docking station 10. For example, if the name of a slave device is "Family Keyboard", the name of the relayed device may be "Family Keyboard trough Docking Station". These virtual slave devices b1-bN are configured to pair with the first device 100 using a secured protocol, for instance the Secure Simple Pairing—Out Of Band of Bluetooth V2.1 mentioned above. This protocol advantageously simplifies the user interaction, especially when NFC is used. Both the wireless docking station 10 and the first device 100 support the secured pairing protocol.

Then, the docking station 10 sends information in order to advertise the relayed slave devices b1-bN in the docking environment. When the first device 100 enters the docking environment and happens to be in reach and listening, it receives the information (connection information such as presence, capability, connection details, etc) from the docking station 10 that it may pair to the relayed slave devices b1-bN. Furthermore the first device 100 may receive a description of what these relayed slave devices b1-bN are (e.g. Family Keyboard trough Docking Station), and the pairing protocols they support. It has to be noted that not all of the slave devices a1-aN may need to be relayed. The docking station 10 may identify the slave devices a1-aN which need to be duplicated via a virtual device or not. For example, the docking station 10 may comprise a predetermined list of slave devices for which it has to create and configure corresponding virtual devices, and to advertise said virtual devices in the docking environment. The sending of information for advertising may be performed in different ways. According to one embodiment, it may be performed by Bluetooth on times when the Bluetooth master 11 of the docking station 10, the slave devices a1-aN and the relayed slave devices b1-bN do not need to transmit any message. According to another embodiment, the docking station 10 may comprise another Bluetooth radio module (not shown) dedicated to virtual devices advertisement. In another embodiment, a separate communication channel may be used for the transmission of information. Wi-Fi, Wi-Fi with DNLA (for Digital Living Network Alliance), or Wi-Fi Direct (Wi-Fi peer-to-peer P2P) may be also be used.

Additionally, in order to help the first device 100 to pair with the right relayed slave devices b1-bN, the docking station 10 may also send messages informing which slave devices a1-aN present in the network should be ignored for pairing directly, because the docking station 10 provides another more secured and convenient way to connect to them through the virtual slave devices b1-bN.

Then, when the user wants to pair the first device 100 in the docking environment, he selects all or part of the relayed slave devices b1-bN. The first device 100 may also select or suggest selecting predetermined relayed slave devices that are convenient for it. For example, the predetermined devices may be listed in a memory of the first device 100. Then the first device 100 creates a connection, e.g. a Bluetooth connection in the case of the Bluetooth Simple Secure Pairing protocol, with the selected virtual slave devices b1-bN that the docking station 10 has configured. Then, by using NFC for authentication for example, the user may just have to make the first device 100 and the docking station 10 touch, so as to provide the same effect as it touches each of the selected virtual slave devices b1-bN. So the action of the user is simpler, as he only needs to interact one time whatever the number of selected virtual slave devices b1-bN. The first device 100 becomes the master of the new connection.

In another embodiment, the docking station 10 may choose a slave device to which the first device 100 has to touch for performing the authentication via NFC and send the corresponding information to the attention of the first device 100.

After establishment of the new connections, the docking station 10 relays all communication between the slave devices a1-aN it is paired with and the corresponding virtual slave devices b1-bN it pretends to be, so that the first device 100 is communicating through the docking station 10 with the Bluetooth slave devices a1-aN that are part of the docking environment.

Once the initial pairing of the first device 100 has been done, the docking station 10 and the first device 100 may record in a memory the secured pairing information of the first device 100 to allow automatically further pairing.

Figure 2:
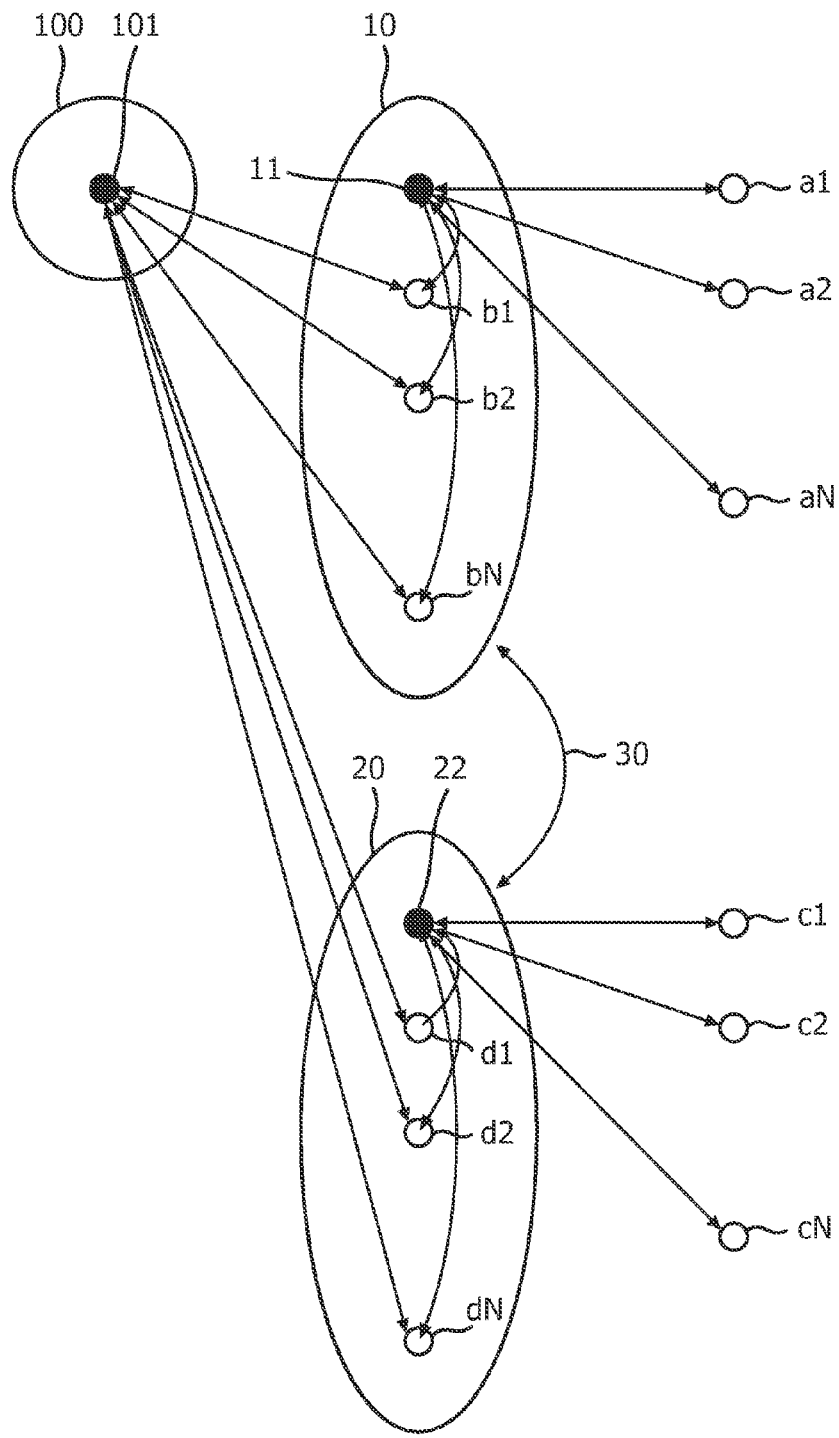
FIG. 2 is a schematic drawing of a wireless network with two clusters of slave devices, two intermediate system, relayed devices, and first master device.
Figure 3:
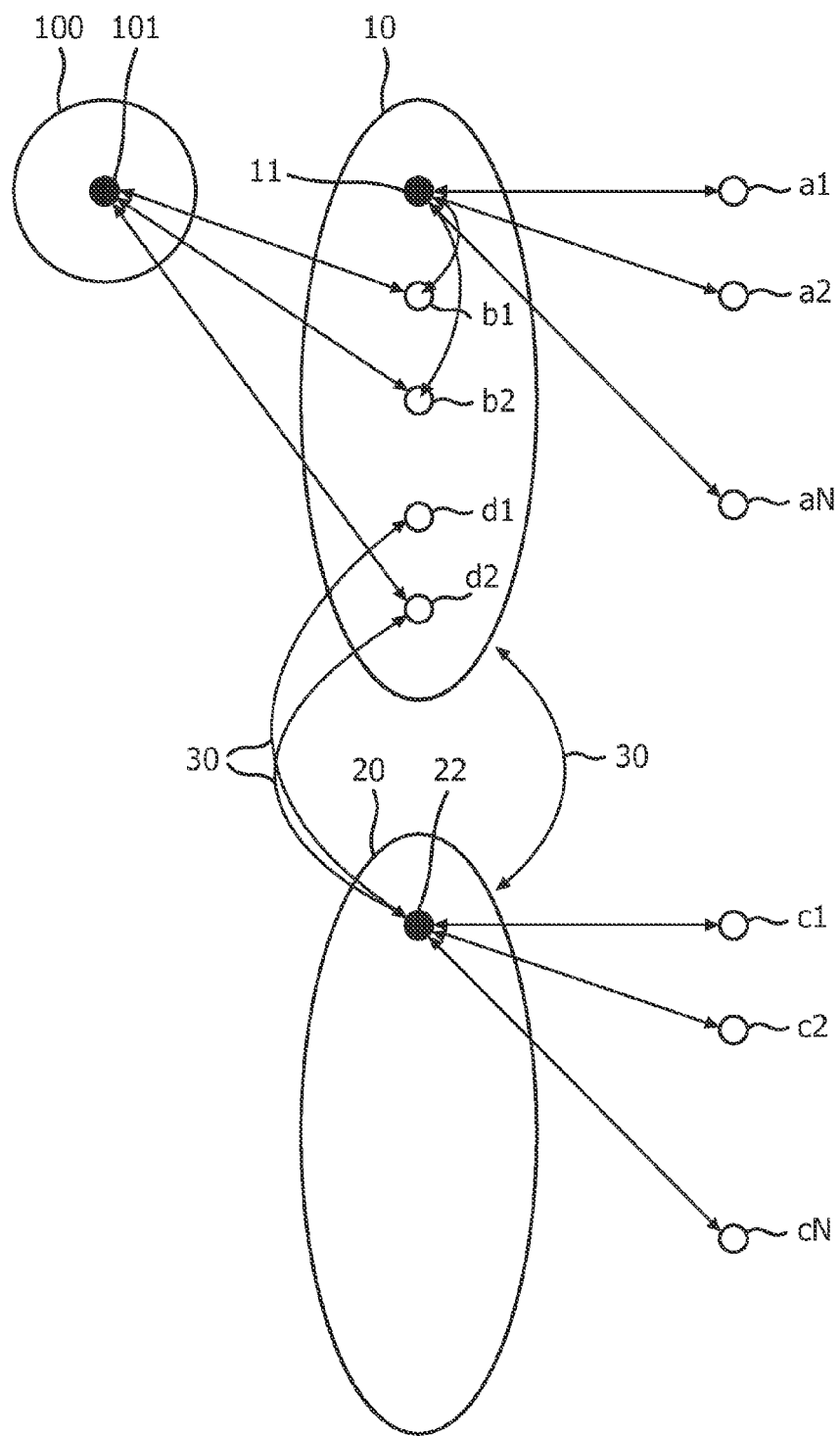
FIG. 3 is a schematic drawing of another embodiment of FIG. 2.

FIGS. 2 and 3 show others embodiments in which the docking environment may comprise at least two clusters of slave devices and one intermediate system for each cluster.

As described above, the user pairs the first cluster of slave devices a1-aN with the second master device 11 of the docking station 10 using an appropriate pairing protocol for each slave device a1-aN. The user pairs also the second cluster of slave devices c1-cN with the third master device 22 of the docking station 20 using an appropriate pairing protocol for each slave device c1-cN.

In the embodiment of FIG. 2, after this initial pairing, in a next step, each docking station 10, 20 creates and configures virtual or relayed slave devices b1-bN, d1-dN. These relayed slave devices can be paired using a secured protocol, but are otherwise identical to the already paired slave devices. The same process as described above applies.

In order to enable a convenient pairing between all the relayed slave device b1-bN, d1-dN and the first device 100, the docking stations 10 and 20 configure a communication channel 30 between them for exchanging information (connection information such as presence, capability, connection details, etc) of the relayed slave devices b1-bN, d1-dN, and the docking station 10 sends to the first master device 101 information (connection information such as presence, capability, connection details, etc) about the relayed slave devices b1-bN, d1-dN. To configure such a communication channel, each docking station 10, 20 comprises a transmitter/receiver radio module (not shown), preferably adapted to implement Wi-Fi communication. A software module is also implemented in the docking stations 10, 20 to control the transmitter/receiver. Other communication channels may be used, such as a wired communication channel for example.

In the embodiment of FIG. 3, the docking stations 10 and 20 also configure at least a communication channel 30, for example a Wi-Fi or wired communication channel, for making available data of the second cluster of slave the devices c1-cN to the docking station 10 and for relaying the messages between the docking station 10 and c1-cN on the one hand, and between the docking station 20 and d1-dN on the other. After the initial pairing of the slave devices a1-aN, c1-cN, the docking station 20 sends all the necessary data to enable the docking station 10 to configure all the relayed slave devices b1-bN, d1-dN which correspond to the slave devices a1-aN, c1-cN. The relayed slave b1-bN, d1-dN devices are adapted to pair with the first master device 101 using a secured pairing protocol as described above. And then docking station 10 sends to the first master device 101 connection information about the relayed slave devices b1-bN, d1-dN.

An advantage of the embodiment of FIGS. 2 and 3 is that the number of slave devices is not limited to the capacity of the intermediate system 10. A further advantage is that each intermediate system 10, 20 may have a different specialization and can pair with appropriated Bluetooth devices. For instance, one intermediate system may be a display that can pair with a Bluetooth keyboard and mouse, but not with a Bluetooth headset, whereas another intermediate system may be an audio system that can be paired with a Bluetooth headset, but not a mouse or keyboard.

The invention claimed is:

1. A method for enabling a wireless secured communication between multiple slave devices and a first master device, the method comprising:
    pairing the multiple slave devices with a wireless docking station using pairing protocols implemented on the multiple slave devices that enable a second wireless secured communication between the multiple slave devices and the wireless docking station using second link keys;
    generating, by the wireless docking station, multiple virtual slave devices that correspond to the multiple slave devices such that each virtual slave device is functionally identical to a corresponding slave device while having a different device address, the multiple virtual slave devices being adapted to pair with the first master device using a secured pairing protocol; and
    transmitting, by the wireless docking station to the first master device, information associated with the multiple virtual slave devices for pairing the multiple virtual slave devices with the first master device using the secured pairing protocol that enables a first wireless secured communication between the multiple virtual slave devices and the first master device using first link keys different from the second link keys.

2. The method of claim 1, further comprising:
    the first master device connecting to selected ones of the multiple virtual slave devices; and
    performing only once an interaction with the selected ones of the multiple virtual slave devices in accordance with the secured pairing protocol.

3. The method of claim 2, in which the secured pairing protocol includes an out-of-band interaction between the first master device and the wireless docking station.

4. The method of claim 2, in which the first master device only pairs with at least one predetermined virtual slave device.

5. The method of claim 2, further comprising recording secured pairing information to automatically allow future pairing between the first master device and the selected ones of the multiple virtual slave devices.

6. The method of claim 1, wherein the secured pairing protocol is a short range communication protocol.

7. The method of claim 6, wherein the secured pairing protocol requires authentication.

8. The method of claim 7, wherein the authentication for the secured pairing protocol is configured to use a Near Field Communication between the first master device and the wireless docking station.

9. The method of claim 1, further comprising:
pairing an additional set of at least one slave device with an additional wireless docking station using a pairing protocol implemented on the at least one slave device of said additional set;
the additional wireless docking station generating an additional set of at least one virtual slave device which corresponds to the additional set of at least one slave device, the additional set of at least one virtual slave device being adapted to pair with the first master device using a secured pairing protocol;
configuring a communication channel between the additional wireless docking station and the wireless docking station to exchange information associated with the additional set of a t least one virtual slave devices; and
one of the wireless docking stations sending to the first master device the information associated with the additional set of at least one virtual slave device.

10. The method of claim 1, further comprising:
pairing an additional set of at least one slave device with an additional wireless docking station using a pairing protocol implemented on the at least one slave device of said additional set;
configuring a communication channel between the additional wireless docking station and the wireless docking station to make available data of the additional set of slave devices to the wireless docking station;
the wireless docking station configuring an additional set of at least one virtual slave device which corresponds to the additional set of at least one slave device, the additional set of at least one virtual slave device being adapted to pair with the first master device using a secured pairing protocol; and
the wireless docking station sending to the first master device information associated with the additional set of at least one virtual slave device.

11. A wireless docking station for enabling a wireless secured communication between multiple slave devices and a first master device, said wireless docking station comprising:
a transceiver configured to pair with the multiple slave devices using pairing protocols implemented on the multiple slave devices so as to enable a second wireless secured communication between the multiple slave devices and the wireless docking station using second link keys;
at least one processor configured to generate multiple virtual slave devices such that each virtual slave device is functionally identical to a corresponding slave device while having a different device address, wherein the multiple virtual slave devices are adapted to pair with the first master device using a secured pairing protocol; and
the transceiver being further configured to send to the first master device information associated with the multiple virtual slave devices for pairing the multiple virtual slave devices with the first master device using the secured pairing protocol that enables a first wireless secured communication between the multiple virtual slave devices and the first master device using first link keys different from the second link keys.

12. The wireless docking station of claim 11, wherein the first master device is configured to connect to selected ones of the multiple virtual slave devices using the transceiver; and
the wireless docking station is further configured to perform an interaction required by the secured pairing protocol only once with the selected ones of the multiple virtual slave device.

* * * * *